E. E. WICKERSHAM.
SUPPORT FOR CHAIN TRACKS.
APPLICATION FILED MAY 26, 1917.
1,258,611.
Patented Mar. 5, 1918.
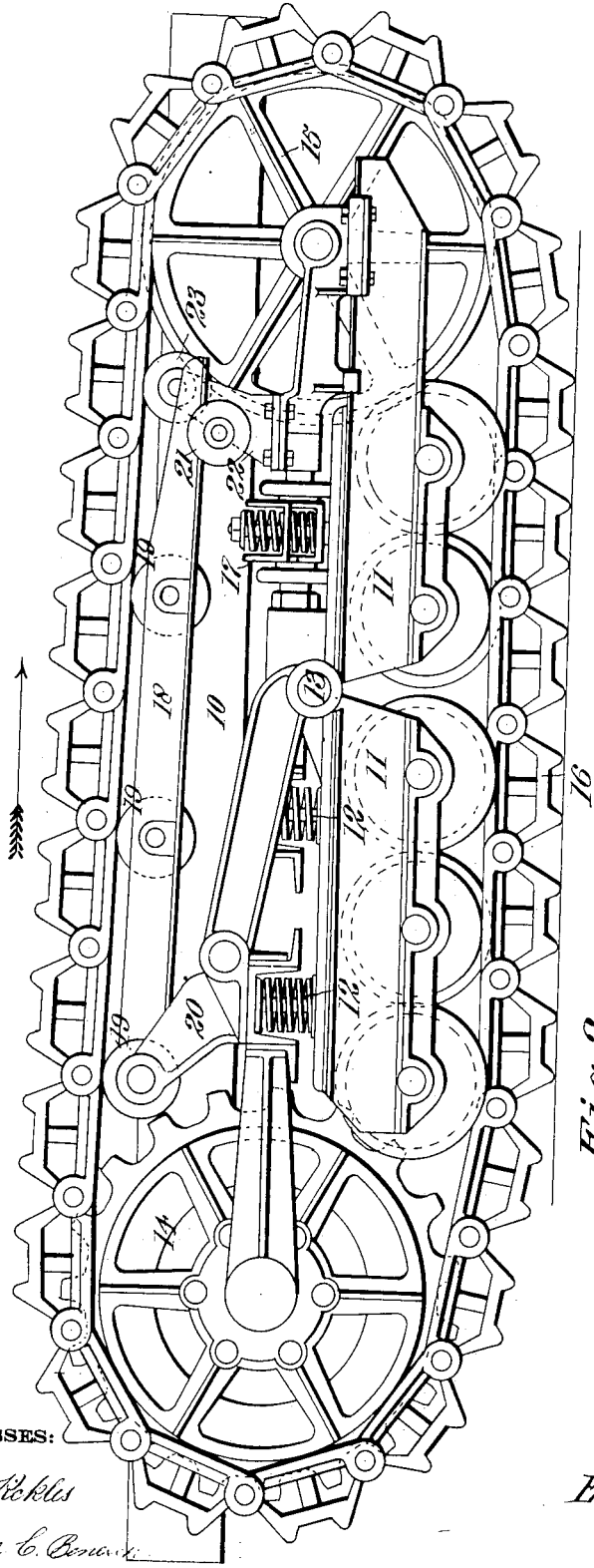
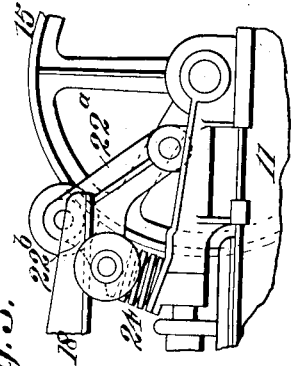
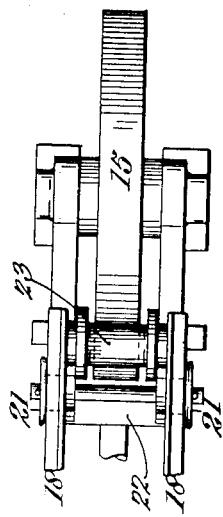
WITNESSES:
INVENTOR
Elmer E. Wickersham
BY Strong & Townsend
ATTORNEYS

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

SUPPORT FOR CHAIN-TRACKS.

1,258,611.      Specification of Letters Patent.      Patented Mar. 5, 1918.

Application filed May 26, 1917. Serial No. 171,172.

*To all whom it may concern:*

Be it known that I, ELMER E. WICKERSHAM, citizen of the United States, residing at Stockton, in the county of San Joaquin and State of California, have invented new and useful Improvements in Supports for Chain-Tracks, of which the following is a specification.

This invention relates to tractor truck mechanism of the self-laying track type wherein roller truck frames are yieldingly connected to the main frame for supporting the same and operate upon the lower run of the track, normally retaining said lower run below a straight line tangential to the driving and carrying sprocket wheels. The upper run of the track is generally in a straight line tangential to the carrying and driving wheels and in prior trucks idler rollers for supporting the upper run have been fixed to the main frame. Therefore when the roller trucks rock or move upwardly slack is produced in the track which causes the upper run thereof to buckle and the links to slap the driving and carrying wheels with considerable force. In the present invention I prevent formation of slack in the chain or track by so connecting the carrying rollers for the upper run thereof with the roller truck mechanism that the rocking or upward movement of the latter shall be imparted to the idler rollers to the extent that the track is kept constantly under substantially the same tension.

In chain tracks of the self-laying type the links are constantly rising and falling at points adjacent to the driving or carrying wheels, due to the varying angles of the links while traveling around the periphery of the wheels. This results in the production of considerable shocks and noises in the operation of the track and I have provided in connection with the present invention means for preventing these shocks and cushioning the movement of the links in such manner as to eliminate considerable clatter and noise.

In the accompanying drawing, Figure 1 shows a side elevation of a tractor truck mechanism embodying my invention.

Fig. 2 shows a detail view in plan of the blank carrying wheel for the chain track.

Fig. 3 shows a detail view in side elevation of a modified arrangement of my invention wherein cushioning means are provided for absorbing the shocks caused by the movement of the links into engagement with the blank carrying wheel.

The tractor truck mechanism shown comprises a main frame 10 and roller truck mechanism 11 supporting the same by means of springs 12, said roller truck mechanism being jointed at 13. A driving sprocket wheel 14 is provided at the rear of the main frame and a blank carrying wheel 15 is journaled on the roller truck mechanism at the front thereof. An endless flexible track 16 passes around the driving and carrying wheels and forms a track for the roller truck mechanism which track is below a straight line tangential to the driving and carrying wheels 14 and 15. The roller truck mechanisms at opposite sides of the main frame are yieldingly connected to said frame at their front and rear ends. Owing to these connections the roller truck mechanisms have considerable movement relatively to the main frame, particularly at their forward portions and upward movement of the same allows the lower run of the track to approach a straight line, thus producing considerable slack in the chain. In order to take up this slack I provide supporting means for the upper run of the same comprising a girder bar 18 fitted throughout its length with rollers 19 and pivoted at its rear end on a bracket 20 fixed to the main frame adjacent the driving wheel 14. The forward portion of the girder bar rests upon a roller 21 journaled on an arm 22, which arm, as shown in Fig. 1, may be connected rigidly with the forward portion of the roller truck mechanism and movable therewith. The arm 22 is preferably forked or bifurcated so as to extend along opposite sides of the blank carrying wheel 15 and carries a roller 23 at its upper end, which roller is positioned as close as possible to the vertical center of said wheel 15 and forms a support and guide for the upper run of the track at this point.

When the truck mechanism 11 is moved upwardly, as, for instance, in passing over obstructions, it will carry with it the roller 22, thus lifting the bar 18 and raising the upper run of the track to a sufficient degree to prevent the formation of slack in the chain.

In Fig. 3 I show a modified arrangement wherein the arm 22 is made angular and has 1 a forwardly disposed portion 22ª pivotally connected to the roller truck mechanism adjacent the journal bearing of the wheel 15 and a rearwardly disposed portion 22ᵇ resting on a spring 24 seated on the roller truck mechanism. The spring 24 tends constantly to raise the arm 22, thus keeping the roller 23 in constant engagement with the links of the chain, which, at this point, are continually changing their angles as they move into engagement with the blank carrying wheel 15. A cushion is thus formed which prevents the forceful striking of the links against the periphery of the wheel and eliminates the objectionable noises and shocks present in prior devices of this general type.

Various changes in the construction and arrangement of the several parts herein shown and described may be employed without departing from the spirit of my invention as disclosed in the appended claims.

Having thus described my invention, what I claim and desire to secure by Letters Patent is:

1. A tractor truck mechanism including a main frame, roller truck mechanism yieldingly connected therewith, an endless flexible track for the roller truck mechanism, carrying and driving wheels for the track positioned above the lowermost plane of the rollers and means carried by the roller truck mechanism and the main frame for supporting the upper run of the track whereby upward movements of the roller truck mechanism are imparted to the upper run of the track to keep the same taut.

2. A tractor truck mechanism including a main frame, roller truck mechanism yieldingly connected therewith, an endless flexible track for the roller truck mechanism, carrying and driving wheels for the track positioned above the lowermost plane of the rollers and means carried by the roller truck mechanism for supporting the upper run of the track whereby upward movements of the roller truck mechanism are imparted to the upper run of the track to keep the same taut, said supporting means comprising a bar fitted with rollers in engagement with the track and pivotally supported at one end on the main frame and at the other supported upon a roller carried by and movable with the roller truck mechanism.

3. A tractor truck mechanism including a main frame, roller truck mechanism yieldingly connected therewith, an endless flexible track for the rollers of the truck mechanism, a driving sprocket wheel for the track journaled upon the main frame at the rear thereof, a blank carrying wheel for the track journaled upon the roller truck mechanism at the front thereof, said driving and carrying wheels having their lowermost portions positioned above the lowermost portions of the roller truck mechanism, and supporting means for the upper run of the track carried by the roller truck mechanism, said supporting means comprising a longitudinally extending bar pivoted at its rear end to the main frame and fitted with rollers throughout its length in engagement with the upper run of the track and a roller supporting the forward end of said bar, said roller being carried by and movable with the roller truck mechanism.

4. A tractor truck mechanism including a main frame, a roller truck mechanism yieldingly connected therewith, an endless flexible track for the roller truck mechanism, carrying and driving wheels for the track and a supporting roller for the upper run of the track adjacent the forward track carrying wheel and a spring support for said roller mounted upon the roller truck mechanism.

5. A tractor truck mechanism including a main frame, a roller truck mechanism yieldingly connected therewith, an endless flexible track for the roller truck mechanism, carrying and driving wheels for the track, a supporting roller for the upper run of the track adjacent the forward carrying wheel, a supporting arm for said roller pivotally connected to the roller truck mechanism and a cushioning member interposed between the pivoted arm and the roller truck mechanism.

6. A tractor truck mechanism including a main frame, a roller truck mechanism yieldingly connected therewith, an endless flexible track for the roller truck mechanism, carrying and driving wheels for the track, a supporting roller for the upper run of the track adjacent the forward carrying wheel, a supporting arm for said roller pivotally connected to the roller truck mechanism and a cushioning member interposed between the pivoted arm and the roller truck mechanism, a second roller on said pivoted arm and a bar resting on said second roller extending rearwardly and fitted throughout its length with rollers engaging and supporting the upper run of the track.

7. In a tractor truck mechanism of the self-laying track type including a rear driving wheel and a front idler wheel for the track, means adjacent the front idler wheel for supporting the links of the track as they move into engagement with said wheel, said means pressing constantly against the links regardless of the change in the position of the same and forming a cushion therefor to prevent forceful striking of the links against the periphery of the blank idler wheel.

8. A tractor truck mechanism including a main frame, roller truck mechanism yieldingly connected therewith, an endless flexible track for the roller truck mechanism, carrying and driving wheels for the track positioned above the lowermost plane of the rollers, and means carried by the main frame for supporting the upper run of the track, and connections between said last named means and the roller truck mechanism whereby upward movements of the roller truck mechanism are imparted to the upper run of the track to keep the same taut.

In testimony whereof I have hereunto set my hand in the presence of two subscribing witnesses.

ELMER E. WICKERSHAM.

Witnesses:
F. W. TARR,
E. O. BOQUIST.